United States Patent [19]

Luers

[11] 4,295,872

[45] Oct. 20, 1981

[54] PRODUCING A MULTI-COLOR IMAGE IN POLYCHROMATIC GLASS

[75] Inventor: George A. Luers, Horseheads, N.Y.

[73] Assignee: Corning Glass Works, Corning, N.Y.

[21] Appl. No.: 128,831

[22] Filed: Mar. 10, 1980

[51] Int. Cl.³ .................... C03B 25/00; C03B 32/00; C03C 3/22; C03C 3/26
[52] U.S. Cl. ...................................... 65/30.11; 65/32; 65/33; 65/60 R; 156/100; 430/5; 430/7; 430/494
[58] Field of Search ............ 65/33, DIG. 2, 32, 60 R, 65/30.11; 430/5, 7, 351, 494; 156/100

[56] References Cited

U.S. PATENT DOCUMENTS

| | | | |
|---|---|---|---|
| 4,057,408 | 11/1977 | Pierson et al. | 65/33 X |
| 4,092,139 | 5/1978 | Ference | 65/33 X |
| 4,134,747 | 1/1979 | Pierson et al. | 65/33 X |

Primary Examiner—Richard V. Fisher
Attorney, Agent, or Firm—Clinton S. Janes, Jr.

[57] ABSTRACT

There is disclosed a method of producing an image of an original multi-color subject in polychromatic glass by employing as a masking means, during initial exposure of the glass, high contrast film positives embodying the subject in the form of half tone transparencies. Preparation of the film positives for masking purposes is also described.

14 Claims, 4 Drawing Figures

STEP I. PRODUCTION OF COLOR SEPARATION NEGATIVE

STEP II. PRODUCTION OF SCREENED MASK

STEP III. FIRST UV EXPOSURE OF POLYCHROMATIC GLASS

STEP I. PRODUCTION OF COLOR SEPARATION NEGATIVE

STEP II. PRODUCTION OF SCREENED MASK

STEP III. FIRST UV EXPOSURE OF POLYCHROMATIC GLASS

PRODUCING A MULTI-COLOR IMAGE IN POLYCHROMATIC GLASS

RELATED APPLICATION

My companion application, Ser. No. 128,844, also entitled "Producing a Multi-Color Image in a Polychromatic Glass", and filed of even date herewith, provides a method of producing an image of an original multi-color subject in polychromatic glass by employing, as a mask during initial exposure of the glass, a continuous tone, ultra-violet transmitting, film negative in which each color in the original subject is recorded in terms of a unique film density corresponding to that color in the glass and capable of conditioning the glass for development of such color by transmission of a single predetermined exposure flux.

BACKGROUND OF THE INVENTION

This invention is concerned with a form of photosensitively colored glass known as polychromatic glass. It is particularly concerned with a new and improved method of selectively developing a multi-colored image in such a glass.

Polychromatic glasses are capable of having a range of colors developed therein by certain combinations of radiation exposure and thermal treatment. Colors in such glasses result from a unique combination of alkali fluoride-silver halide microcrystals and metallic silver particles. It is not certain whether the silver is coated on, or contained in, the microcrystals, or whether it exists separately therefrom in minute discrete particles. Variation in color results from variation in exposure flux which is defined as the product of radiation intensity and exposure time.

The physical and chemical characteristics of polychromatic glasses, as well as general methods of development of a range of colors therein, are disclosed in detail in U.S. Pat. No. 4,017,318, granted Apr. 12, 1977 to J. E. Pierson and S. D. Stookey. U.S. Pat. No. 4,057,408, granted Nov. 8, 1977 to the same inventors, contains essentially the same disclosure and claims method aspects of the invention. The entire teaching of these patents is incorporated herein by reference to avoid repetition.

The patents generally disclose that polychromatic glasses may have widely-varying compositions, but must contain silver, alkali oxide, fluoride, at least one halide selected from the group of chloride, bromide and iodide, and, if ultra-violet radiation is employed, cerium oxide in minute amount. They further describe a general method of color production comprising four distinct steps:

(1) exposure to actinic or high energy radiation,
(2) heat treatment at a temperature between the glass transformation range and softening point,
(3) re-exposure of the glass to actinic or high energy radiation, and
(4) reheating to a temperature within or above the transformation range, but below the glass softening point.

In accordance with the patent teachings, a range of colors may be developed in a glass of suitable composition by first exposing the glass to actinic (ultra-violet) radiation in the range of 2800–3500 Å, or to high energy radiation such as X-rays or high velocity electrons. The amount of exposure flux from this exposure determines the depth and ultimate hue of the color to be produced in the glass, although only a latent image is developed in the glass during this initial exposure.

The glass is then subjected to a heat treatment at a temperature ranging from about the transformation range of the glass up to approximately its softening point. The glass composition selected, as well as the temperature and duration of the heat treatment, determine whether the final product will be transparent or opacified. The heat treatment causes colloidal silver particles to precipitate and serve as nuclei for the growth of alkali fluoride-silver halide microcrystals.

The nucleated glass is then exposed to high energy or actinic radiation a second time. The intensity and time of this second exposure depends on the desired intensity or saturation of the hue which was predetermined by the first exposure.

Finally, the glass is heated to a temperature within, or somewhat above, the transformation range, but below the glass softening point. It is believed that submicroscopic particles of metallic silver precipitate on the alkali fluoride-silver halide crystals during this heat treatment, thereby giving rise to color in the glass. The transformation range of a glass is commonly considered to lie in the vicinity of the glass annealing point.

U.S. Pat. No. 4,092,139, granted May 30, 1978 to J. Ference, discloses an alternate color developing procedure whereby the second exposure (the re-exposure) of the Pierson-Stookey method is carried out at a temperature between 200° and 410° C. to cause the metallic silver to precipitate, thus obviating the separate reheating step. Also, U.S. Pat. No. 4,134,747, granted Jan. 16, 1979 to Pierson and Stookey, describes a procedure wherein the potentially polychromatic glass is melted in a reducing atmosphere. During the color development procedure, this modification produces a so-called reverse opal effect, whereby exposed portions of the glass remain transparent, although colored, and unexposed portions of the glass become opacified.

PURPOSES OF THE INVENTION

The spectral sensitivity of the human eye is similar to that of black and white panchromatic film. However, as illustrated in FIG. 1 of the accompanying drawing, there is a distinct lack of direct correlation between these sensitivities and that of polychromatic glass. Hence, development of a multi-color image in such glass by direct photography is essentially impossible.

It is a primary purpose of this invention to provide a novel method for faithfully reproducing a multi-color pattern, design, or other subject, in polychromatic glass. A further purpose is to accomplish this with standard photographic and graphic arts materials. Another purpose is to provide a method wherein each of a range of colors is produced by a separate glass exposure. A particular purpose is to provide a practical means of utilizing polychromatic glass as an art medium whereby intricate, multi-color patterns or designs may be reproduced therein. Another particular purpose is to produce a multi-color image in a polychromatic glass using a halftone screened photographic film positive as a photomask or filter medium.

PRIOR ART

Reference is made to the several patents mentioned above in discussing the invention background. In particular, attention is directed to Examples 52–55 of the Pierson-Stookey patents. These disclose use of continuous tone, photographic film negatives in the exposure step of polychromatic glass processing.

Patents and literature relative to photosensitive materials, cited in the specifications of, or during prosecution of, these patents, may also be relevant. In addition, reference is made to textual publications describing current photographic film processing materials and techniques, in particular halftone film processing. For example, reference may be made to "Basic Photography for the Graphic Arts", (1972) published by Eastman Kodak, and "Basic Color for the Graphic Arts" (1964), also published by Eastman Kodak.

SUMMARY OF THE INVENTION

Figure 1:
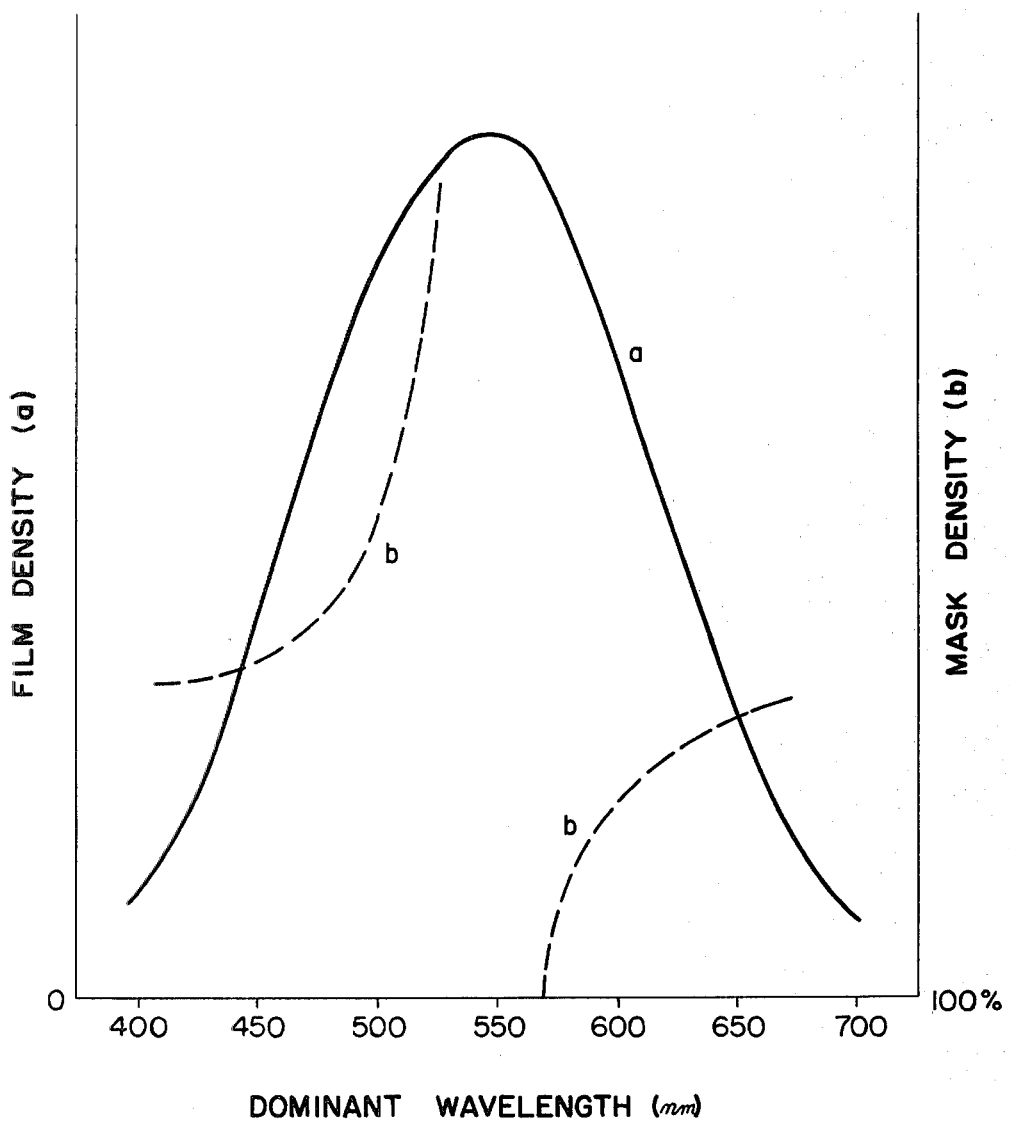
FIG. 1 is a graphical illustration comparing film density, as developed in a typical panchromatic photographic film in response to color exposure, with hues produced in a polychromatic glass.

The present invention is a modification of the basic double exposure and double thermal treatment procedure for reproducing a multi-color subject in a polychromatic glass body, the glass containing an alkali fluoride and a silver halide selected from silver chloride, silver bromide and silver iodide and being capable of integral and multiple coloration by metallic silver. In accordance with the basic process, a portion of the glass body surface is exposed to high energy or actinic radiation at a temperature below the glass transformation range, and the exposed glass is then heated at a temperature between the glass transformation range and the glass softening point to cause nucleation and growth of alkali fluoride microcrystals in conjunction with silver halide. The nucleated glass is again exposed to high energy or actinic radiation and reheated to cause nuclei growth and color development.

The present invention modification is primarily concerned with the initial exposure step of the basic four-step process, and, more particularly, the use of standard photographic film to prepare a mask for use in such exposure step. Thus, except as otherwise indicated herein, it contemplates adopting known polychromatic glass development techniques without change. The use of photographic film in the present modification necessarily precludes the original alternative of using high energy radiation, such as X-rays, for exposure purposes. Hence, the glass is initially exposed to ultraviolet radiation through one or more high contrast film positives in which an image, corresponding to the original subject, is embodied in the form of half tone dot transparencies.

In accordance with a preferred embodiment of the invention, a set of continuous tone color separation negatives is produced wherein each negative corresponds to a primary color selected for reproduction in the polychromatic glass. The negatives are produced by serially photographing the original subject on panchromatic, black and white film through a series of color filters, each filter corresponding in color to one of the selected primary colors. Each continuous tone, black and white negative thus produced is copied through a half tone screen onto a high contrast film to form a screened (dot) positive transparency for each color. The polychromatic glass is then individually and sequentially exposed through each such positive transparency to embody in the glass a latent image composed of distinct dot arrays. The time of exposure through each positive transparency is determined by the time required to impart to the glass a latent color corresponding to that transparency and the color it represents. Thereafter the glass may be heat treated and reexposed in known manner to produce a full color reproduction of the original subject. To generalize this preferred embodiment, N different colors, or radiation spectral transmission zones, are selected to be reproduced, N different color separation negatives are produced on panchromatic, black and white film, each of these negatives is copied onto a high contrast film in a dot pattern, by exposure for a time determined by the ultimate desired color, to produce N high contrast positives or masks, and the polychromatic glass is then given a total of N exposures, one exposure through each such dot pattern positive mask.

GENERAL DESCRIPTION

In processing polychromatic glass, color variation is achieved by varying the initial exposure flux, that is, the magnitude of the initial exposure. In terms of a formula, Exposure flux = intensity × time with exposure flux being increased by increasing either time of exposure to, or intensity of, the radiation. The range of colors produced with increasing exposure flux is pale yellow, green, blue, violet, red, orange and yellow. The present invention provides an indirect method of achieving controlled variation in exposure flux, and hence color, characterized by use of photographic film in the exposure process.

Examples 52–55 of the Pierson-Stookey patents disclose exposing a polychromatic glass through a continuous tone photographic film negative, thereby using the film as a filter medium to selectively vary the exposure intensity. Thus, the desired image or design is recorded in the film negative and the glass exposed to a source of radiation through such film negative for a predetermined time.

Unfortunately, however, as suggested by these examples, there is little correlation between a color being reproduced, the density developed by that color in a film negative, and the resultant color produced in the polychromatic glass when a standard film negative is used as an ultraviolet exposure filter. This lack of relationship may be readily seen from the comparative curves constituting FIG. 1 of the drawing. A direct correspondence must be established among these three parameters to render a continuous tone method feasible.

In FIG. 1, the vertical axis represents spectral sensitivity while the horizontal axis represents wavelength in nanometers. In this FIGURE, actinic density is compared to original saturated colors for panchromatic film in the solid line curve, while ultra-violet filter density is compared to hues produced in polychromatic glass in the broken line curve.

Black and white, panchromatic film has a spectral sensitivity similar to that of the human eye, as shown by the solid-line curve of FIG. 1. This curve is generated only when maintaining constant and uniform saturation and lightness values for the photographed hues. Photographing original full-color artwork, with constant saturation and lightness values, through a set of properly selected filters will map the solid-line curve into the broken-line curve, allowing the direct preparation of photomasks. While seemingly very simple, this technique is not without very strict limitations. For example, it requires special controls in producing the mask, it does not permit color saturation control, and, as a practical matter, it is suitable only for reproducing a design of a few colors.

Rather than individually producing all of the required colors when making a full-color picture, the graphic arts industry commonly employs what is known as a halftone process. Such a process requires the production of only a few different colors to yield a full colored picture. Each color, typically three, is put into the reproduction in the form of dots. While the number density of the dots is selected by the photographer and is uniform throughout the picture, the size of the dots is dictated by the original subject. The dots of a particular color are largest in the positive image area corresponding to the area of the original subject where that color is dominant, and tend to vanish where that color is lacking in the original. By varying the percentage of dot area of a single hue, a range of saturations within a given hue can be obtained. The combination of dots of the various hues produces an image visually comparable to the original.

The present invention then provides a method of processing polychromatic glass that generally utilizes techniques of the type described above with respect to the known half-tone process. It further provides a method of processing polychromatic glass whereby a range of saturations within a given hue may be produced. It also provides a means of producing a full-color picture in polychromatic glass by using only a few basic colors.

In general terms then, N different colors or hues are selected, N different color separation negatives are produced on panchromatic, black and white film, the N negatives are then copied onto high contrast films in halftone or dot patterns and the polychromatic glass is then exposed through the N high contrast positives thus produced.

In theory, the number N is unlimited, that is, the invention might be practiced with respect to any selected number of colors or spectral zones. It is obvious, however, that the process becomes much more complex as the number of colors increases. Hence, as a practical matter, the method is preferably limited to a few colors, the embodiment hereafter illustratively described producing a pattern or design composed of three distinct colors, red, blue and green.

SPECIFIC EMBODIMENT

Figure 2:
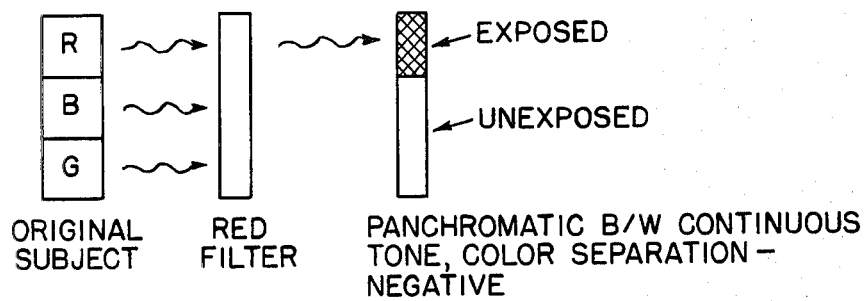
FIG. 2 is a schematic illustration, shown in three steps, for a method of recording a multi-color image in accordance with the invention.
Figure 2:
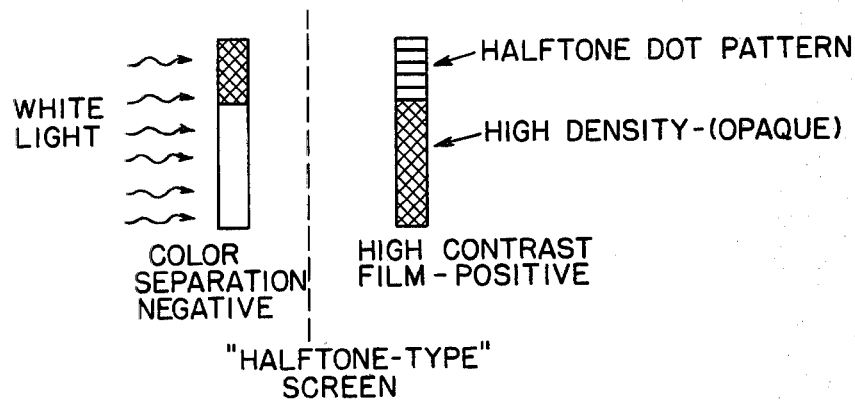
Figure 2:
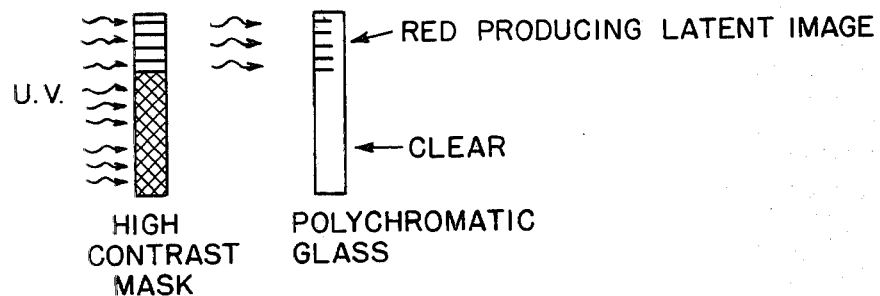

FIG. 2 is a schematic illustration, showing in three steps, a method of recording a multi-color image in a polychromatic glass.

Referring to the drawing, Step I illustrates photographing the original subject through a red filter, that is, a filter that essentially completely absorbs the blue and green portions of the spectrum and transmits the red portion. The subject is photographed through the filter on a panchromatic, black and white, continuous tone film to produce a record of the red component in the original pattern. Hence, those areas of the original pattern which do not have any red component, that is, are entirely blue and/or green, will remain unexposed in the black and white negative.

It will be appreciated that this step will be repeated with a separate film and a blue filter to produce a second negative. Further, the step is repeated a third time with a green filter to produce a third negative in which the green component of the pattern is recorded. Thus, the original pattern or design is separately recorded in three color separation negatives or masks, each bearing a record of its respective areal extent in the original pattern.

It will be noted that, while the three color components in the illustrative pattern are separate and distinct one from another, this will not necessarily be the usual case. Rather, a pattern may be made up of a number of different colors each embodying two or three of the primary colors in varying degree. For example, there may be a yellow area in the pattern which is a mixture of red and green. This area then will appear on both the red and the green separation masks as indicative of this color component.

In Step II, each color separation negative produced in Step I is mounted on one side of a half tone type screen with a high contrast film mounted on the opposite side. The negative is then treated with white light as illustrated. This step is repeated with each color separation negative, thereby producing a corresponding set of half tone (dot pattern) positives on the exposed high contrast films.

The drawing shows, by way of illustration, production of a half tone positive corresponding to the red color separation negative. Thus, the unexposed portion of the negative, that is the portion corresponding to the blue and green components, permits full light passage and, hence, development of an opaque section in the positive. Correspondingly, the red section of the color separation negative, that is, the exposed and darkened portion, produces a corresponding high density network with clear dots on the positive film. It will be appreciated that the blue and green positives will be produced correspondingly.

The density in the exposed portion of each color separation negative determines the size of the clear dots formed in the high contrast film positives in Step II. Thus, if density in a zone of the color separation negative is relatively low, the intensity of exposure through that zone is relatively high. This, in turn, produces larger opaque dots in the high contrast film mask which results in larger clear dots, and consequent lower degree of color, in the glass. For example, a subject may embody both an intense rod zone and a relatively pale or unsaturated red zone. Then the red separation negative of Step I will have zones of two different densities. The zone of greater density (the intense rod zone) will provide lower exposure intensity in Step II thereby resulting in smaller opaque dots being produced in the corresponding zone in the high contrast film. In turn, the zone of smaller opaque dots in the high contrast film mask will produce a zone of smaller clear dots in the glass, thereby resulting in less clear area and hence stronger color development.

In Step III, the high contrast film masks produced in Step II are successively and serially mounted in registry with the polychromatic glass in which the image is to be recorded. The glass is exposed through each mask to produce a corresponding half tone or dot pattern in the glass. It will be appreciated that, in this step, it is extremely important that each of the film masks produced in Step II be precisely in registry during exposure in order to avoid any overlap of exposure in the glass.

The color ultimately developed in the polychromatic glass is determined by the amount of exposure flux transmitted to the glass through each half tone film mask in Step III. Thus, increasing increments of exposure flux produce colors varying from a pale yellow through green, blue, violet, red, orange and dark yellow. Each of the three exposures in Step III then must involve a controlled degree of exposure flux matched to the latent color to be developed in the glass by such exposure. Either intensity of radiation or time of exposure may be varied. However, it is generally easier to vary time, and that was the variable chosen here.

Figure 3:
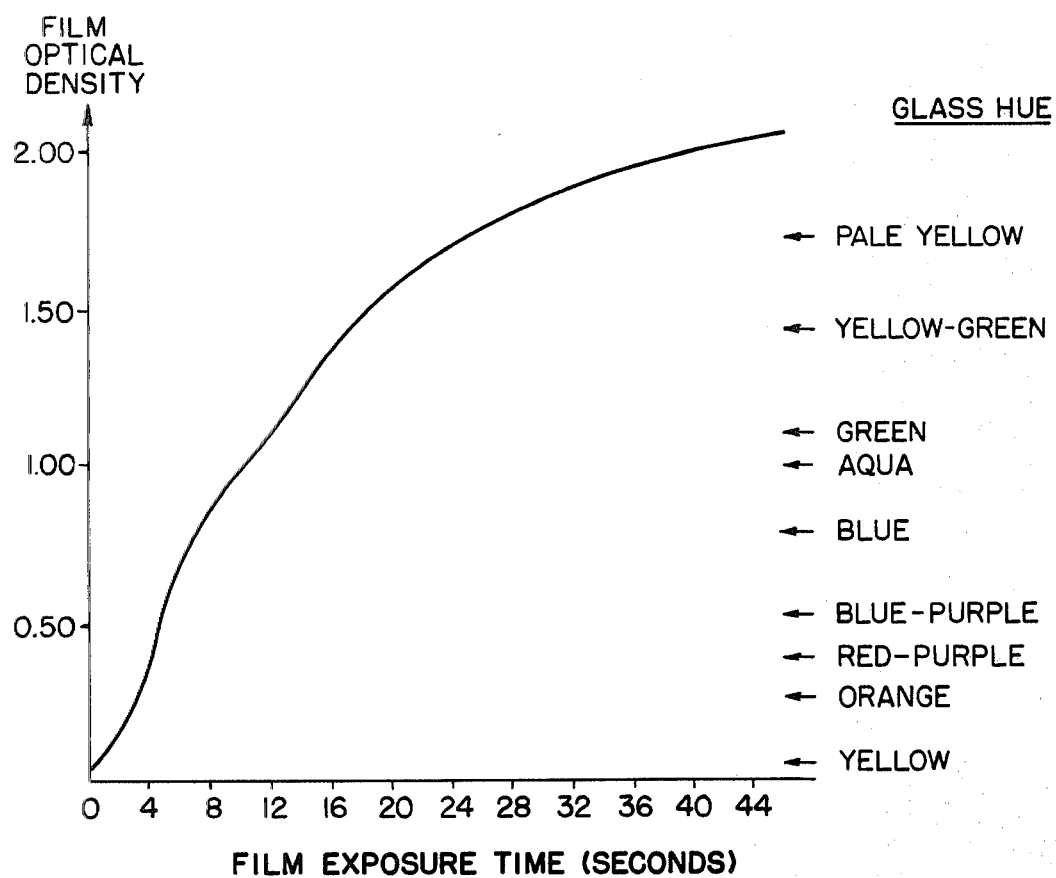
FIG. 3 is a graphical illustration comparing hues in a polychromatic glass with optical density in a film negative and with exposure time.

The relationship of polychromatic glass color to relative exposure flux (or time as here varied) is graphically illustrated in FIG. 3 of the drawing. In that FIGURE, relative exposure time is plotted along the horizontal axis and polychromatic color is plotted along the vertical axis. It will be readily appreciated then that, with a standard set of conditions established for a given color, the appropriate exposure times for the other colors may be readily determined.

The foregoing description presumes a pattern or original subject composed of pure colors occupying well-defined color areas and being no greater in number than the selected colors for the method. As noted earlier with respect to Step I, this situation does not often prevail. Rather, it is much more common to have a pattern employing colors that represent a mixture of basic color components.

When this latter situation is encountered in normal color printing on paper with ink, it is common practice in the graphic arts to employ an overlapping technique wherein inks are intentionally mixed to produce a particular color. Unfortunately, in developing polychromatic glass, where each color has its characteristic exposure time or position on an exposure time scale, overlapping of exposure cannot be used as it is in the conventional procedure.

Figure 4:
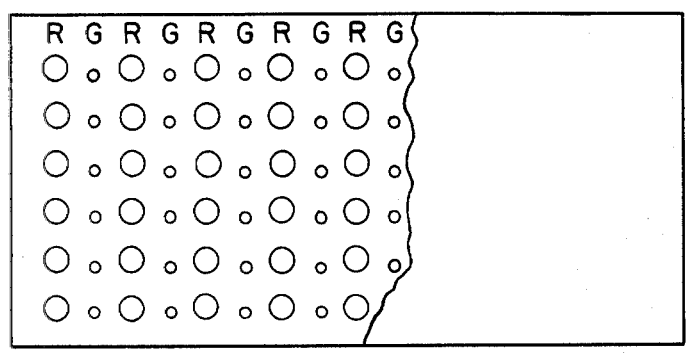
FIG. 4 is a greatly enlarged illustration of a dot pattern in a film positive prepared in accordance with the invention.

If one does have a mixed color, such as the mixture of red and green to produce yellow as given by way of example earlier, it may be necessary to register both the red and green color components in their respective relative amounts. However, they cannot be registered together, that is, one on top of the other so to speak. Rather, they must be registered in an adjacent relationship such that there is no overlapping of dots. This may be accomplished by positioning the several positive film masks in precise registry with one another, but offset by a predetermined amount whereby their respective dot patterns will each be developed in the glass but in an adjacent relationship. This is illustratively shown in FIG. 4 wherein a greatly enlarged dot pattern is shown with a pattern of green-producing dots being slightly out of registry with a pattern of red-producing dots. When the combination of color dots ultimately produced in the glass is observed visually from a sufficient distance, which depends on dot size, it will be appreciated that the distinctions are blurred and a yellow color is observed.

In order to employ the screened system just described, the two causes of dot overlap, dot location and dot size, must be considered, and steps taken to control each. Dot location for the various color arrays is controlled by precise screen registration, and controlled angling of all screens. Dot size in the film screen or mask is determined during film exposure in Step II.

Once a latent image is produced in a polychromatic glass by masked exposure of the glass through halftone (dotted) transparencies, as just described, subsequent processing may follow the known practice described earlier in the background. Thus, the glass may be heat treated at a temperature at or above the glass transformation range, but not above its softening point. Thereafter, the glass is again exposed to ultraviolet radiation which may, for example, be provided by the same ultraviolet lamp used in the initial exposure. Finally, the glass is again heated to a temperature between the transformation and the softening point to develop the multi-color image.

The second exposure step may simply be a flooding of the glass with the selected radiation. However, this may result in an objectionable yellow cast developing in portions of the glass outside the image area. If then, it is desirable to maintain the peripheral glass unexposed, and hence uncolored, the use of an additional screened transparency mask is a possibility. This mask is a composite of the several color separation masks produced for the initial exposure step. It is transparent only in the areas that received any first exposure, thereby masking all of the glass surface outside the image periphery.

In some instances, the image development and film coverage will be confined to less than the total glass surface. In that case, the remaining area may be completely shielded throughout the processing. For flat glass articles, this may be accomplished by applying, to the areas to be masked, a high temperature paint that is opaque to the radiation being employed.

Silk screening may be used to apply a masking paint on flat surfaces, but this does not give high resolution on a curved surface such as a dinner plate. High temperature masking materials may be applied to curved surfaces by means of a pliable material capable of transferring the masking solution to a curved surface.

Presently available polychromatic glasses are not capable of having a black color developed. However, in some cases, a very dark violet or blue may provide an acceptable means of contrast. White is also not available as a polychromatic color, but may be supplied by providing a suitable background. Thus, the glass may be provided with a white backing. Also, polychromatic glass compositions, capable of having opal coloration developed therein, may be employed. At least some polychromatic glasses can have opacifying particles grown by extending the heat treating steps. Also, as described in greater detail in U.S. Pat. No. 4,134,747, polychromatic glasses melted in a reducing atmosphere may undergo reverse opal formation, that is opal formation will occur in unexposed glass areas while exposed areas remain unopacified.

A technique for producing a gray scale, that is any desired shade or shades of gray, involves using a photo-opal glass. A photo-opal glass is one which produces an opalescent crystallization when exposed to ultra-violet radiation and subsequently heat treated. The depth of opalization is dependent on the amount of exposure, with maximum opalization corresponding to the most ultra-violet exposure. The variation of depth results in appearances ranging from nearly opaque, to translus-cent, to clear, corresponding to high, midrange and zero exposure. Affixing a black backing to the glass in the colorless areas of an image combined with varying degrees of white opacity provides a gray scale which ranges from black, for areas having no opalization, to white, for areas having complete opacification.

A continuous tone film mask can be used to control the glass exposure, thereby controlling the amount and location of opacification. The film would be essentially opaque in areas which are to be colored and would have degrees of density corresponding to the amount of opal depth required in the desired areas to provide the necessary degree of gray. The gray areas must be masked during the second ultra-violet exposure to maintain a white opal.

A variation of the technique just described enables varying the brightness of colors as well as producing a gray scale for colorless areas of an image if desired. This technique involves producing a laminated glass article, that is a piece of transparent polychromatic glass laminated to a piece of white photo-opal glass. The photo-opal glass must be provided with a black backing, as by adhering a black layer or coating to the back. A multicolor image will be developed in the polychromatic glass in accordance with the present invention as described earlier. The photo-opal will be developed separately and will contain an opal image corresponding in areal definition to the outer extremities of the total image in the polychromatic glass. The two glasses must be maintained in registration while they are being joined.

A continuous tone mask of variable density may be used in exposing the photo-opal glass for opal development. Thus, the area of greatest density in the film permits the least glass exposure, and results in the least or shallowest opal development. Conversely, areas of decreasing density in the film transmit increasing amounts of radiation to the glass, and hence increase the depth of opal development.

It will be appreciated that a given hue and saturation in a polychromatic glass can thereby have its brightness controlled by the amount of opalization behind it. At the same time, colorless areas can have desired shades of gray developed. Such shades vary from white, when the laminated opal has maximum opal development due to prolonged exposure, to black, when the opal glass has essentially no opal development due to little or no radiation exposure.

The invention has been described in terms of a dot pattern in the halftone masks, and that is the pattern generally contemplated for use. Nonetheless, it is believed evident that other patterns might serve as well. In particular a linear pattern is contemplated, and other than circular dots might be used if desired.

Those familiar with the art will readily perceive numerous variations and modifications other than those specifically described. It is intended that such be encompassed within the scope of the claims that follow.

I claim:

1. An improved method of producing a multicolor image in polychromatic glass wherein the glass is initially exposed to develop a latent image, then heat treated to develop nuclei, and thereafter further exposed and heat treated to develop a full color image, characterized in that the initial exposure is made through at least one high contrast film positive embodying a subject pattern in the form of a half tone transparency, and being further characterized by the fact that the film positive, through which the glass is exposed, covers less than the total glass surface, and the remainder of the glass surface remains masked throughout the glass processing.

2. The method of claim 1 wherein the remainder of the glass surface is covered with a high temperature paint opaque to the activating radiation.

3. A method of producing a multicolor image in polychromatic glass which comprises producing a set of continuous tone, black and white, color separation negatives, wherein each negative corresponds to a selected primary color to be reproduced in the glass, by individually and separately photographing the original subject through a series of color filters, each filter corresponding to a selected color for reproduction, copying each continuous tone, black and white negative thus produced through a half tone type screen onto a high contrast film to form a screened positive transparency corresponding to each negative, individually and sequentially exposing the polychromatic glass through each such positive transparency for a time sufficient to produce the polychromatic glass color nearest to that of the color separation filter, thus producing a latent image composed of distinct pattern arrays corresponding in number to the selected colors and corresponding separation negatives, thereafter heat treating and reexposing the glass to develop the desired multi-color image.

4. The method of claim 3 wherein the selected primary colors are red, blue and green.

5. The method of claim 3 wherein the reexposure is made through a screen transparency mask that is a composite of several color separation negatives and is transparent only in the composite exposed areas.

6. A method of producing an image composed of N colors in polychromatic glass which comprises producing N continuous tone, color separation negatives by recording an image of each color component in the original subject on a separate black and white panchromatic film by photographing the original through a corresponding color filter which absorbs substantially the entire color spectrum except for the selected color or radiation zone, mounting one of such color separation negatives and a high contrast film on opposite sides of a half tone type screen and flooding the negative with white light to convert the high contrast film to a positive mask containing a dot pattern image therein that corresponds in area to the image in the color separation negative, the remainder of the film being opaque, repeating such process with each color separation negative to produce N high contrast film positives, individually and sequentially exposing the polychromatic glass through each such positive transparency for a predetermined time necessary to develop in the polychromatic glass a latent color corresponding to that recorded in the transparency, thereafter heat treating, reexposing and reheating the glass to develop the multicolor image.

7. The method of claim 6 wherein each positive transparency mask is mounted in precise relationship to the mounting of its predecessor, but a specific minute distance out of registry with the position of such preceding transparency, to prevent dot overlap.

8. A method in accordance with claim 6 wherein the second or re-exposure of the glass is through a screened transparency mask having a transparent zone corresponding to the latent image developed in the initial exposure and in registry therewith, the remainder of the mask being essentially opaque to the radiation employed and masking the glass outside the image periphery.

9. An improved method of producing a multicolor image in polychromatic glass wherein the glass is initially exposed to develop a latent image, then heat treated to develop nuclei, and thereafter further exposed and heat treated to develop a full color image, characterized in that the initial exposure is made through at least one high contrast film positive embodying a subject pattern in the form of a half tone transparency, and being further characterized by the fact that the polychromatic glass is provided with a white backing to provide a white color in unexposed areas.

10. An improved method of producing a multicolor image in polychromatic glass wherein the glass is initially exposed to develop a latent image, then heat treated to develop nuclei, and thereafter further exposed and heat treated to develop a full color image, characterized in that the initial exposure is made through at least one high contrast film positive embodying a subject pattern in the form of a half tone transparency, and being further characterized by the fact that the glass is heat treated for a sufficient time to develop opacity within its mass.

11. An improved method of producing a multicolor image in polychromatic glass wherein the glass is initially exposed to develop a latent image, then heat treated to develop nuclei, and thereafter further exposed and heat treated to develop a full color image, characterized in that the initial exposure is made through at least one high contrast film positive embodying a subject pattern in the form of a half tone transparency, and being further characterized by the fact that the glass is melted under reducing conditions so that opal formation occurs in unexposed areas of the glass.

12. An improved method of producing a multicolor image in polychromatic glass wherein the glass is initially exposed to develop a latent image, then heat treated to develop nuclei, and thereafter further exposed and heat treated to develop a full color image, characterized in that the initial exposure is made through at least one high contrast film positive embodying a subject pattern in the form of a half tone transparency, and being further characterized by the fact that a polychromatic glass is selected that is capable of being photosensitive opalized, the glass is exposed to radiation through a continuous tone film mask wherein color areas in the subject are recorded in terms of maximum density whereby essentially no transmission occurs during glass irradiation, gray areas are recorded in film densities inversely related to the depth of gray desired, the glass is exposed to radiation through such film mask and heated to develop opacity in exposed areas, the depth of opacity decreasing with increase in film density, and the glass is then provided with a black backing.

13. An improved method of producing a multicolor image in polychromatic glass wherein the glass is initially exposed to develop a latent image, then heat treated to develop nuclei, and thereafter further exposed and heat treated to develop a full color image, characterized in that the initial exposure is made through at least one high contrast film positive embodying a subject pattern in the form of a half tone transparency, and being further characterized by the fact that the polychromatic glass having a multicolor image developed therein is laminated to a backing of photosensitive opal glass having developed therein an opal image corresponding in areal definition to the outer extremities of the total image in the polychromatic glass, the opal density being greatest behind those color areas where the least reduction in brightness is desired, and the opal glass having a black backing.

14. A method in accordance with claim 13 wherein an area outside the image area in the photosensitive opal is opacified in depth in inverse relation to the darkness of gray color desired in that area.

* * * * *